July 27, 1965

SASUKE TAKAHASHI 3,196,741

MOTION PICTURE SCREEN COATING

Filed Oct. 9, 1961

Sasuke Takahashi
INVENTOR

BY Wenderoth, Lind &
Ponack,     ATTORNEYS 3,196,741
MOTION PICTURE SCREEN COATING
Sasuke Takahashi, 1,159 Uematsu, Yao,
Osaka Prefecture, Japan
Filed Oct. 9, 1961, Ser. No. 143,552
Claims priority, application Japan, Oct. 18, 1960,
35/42,667; Jan. 1, 1961, 36/101
1 Claim. (Cl. 88—28.9)

The present invention relates to a motion picture screen coating and to the manufacture of a motion picture screen therewith.

More specifically, the invention is concerned with the production of a coated motion picture screen in which fine scales of a scabbard fish or similar to natural colorless transparent minute crystals in the form of a flat, parallel thin layer are mixed with a herein after-defined colorless transparent adhering agent after which the so-obtained mixture is sprayed onto the surface of a pure black vinyl sheet or a white vinyl sheet having a pattern of minute black spots numerously dispersed at even intervals. The fine scales of a scabbard fish or natural minute crystals are, from the point of view of optical science, most effective as reflecting material for a motion picture screen; therefore, by spraying either of them onto the pure black vinyl sheet or the while vinyl sheet with a pattern of minute black spots, a screen is produced which gives an incomparably sharp image with not only a clear contrast between light and darkness but also a faint half-tone shade and which clearly reflects the original colors projected thereon without adding any bit of yellowship brown.

Figure 1:
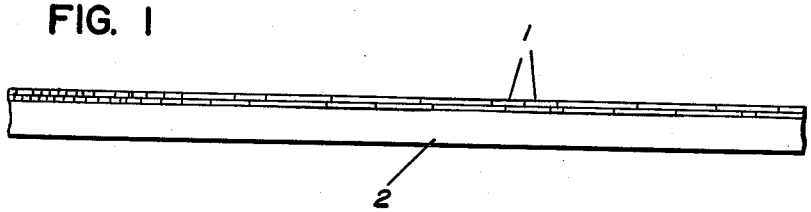
Figure 2:

The drawing illustrates the present invention. FIGURE 1 shows a motion picture screen in which a layer of scabbard fish scales 1 are parallel to a smooth black background 2. FIGURE 2 is an enlarged view of the scabbard fish scales 1.

A presently preferred illustrative embodiment according to the invention is as follows:

First, the scales of a scabbard fish are repeatedly washed with a cleaning material like gasoline in order to wash away any greasy element. Next, an appropriate plastic material, a stabilizer, or in addition thereto a glycolic material, acetic ester, aromatic hydrocarbon, etc. are mixed to produce a fixed plastic material, to which vinyl chloride is added to produce a paste resin. Then, the scales of a scabbard fish are added to said paste resin. After being evenly mixed by stirring, the above-mentioned admixture is further mixed with cyclohexanon. Finally, the so-obtained admixture is sprayed and dried on the surface of a pure black vinyl sheet thereby producing a coated black motion picture screen.

The presently preferred embodiment hereinbefore set forth is not intended to be limitative but solely illustrative. Thus, certain modifications are possible without departing from the scope and spirit of the invention. For instance, the said fine scales of a scabbard fish used as a reflecting material may be replaced by similar natural colorless transparent minute crystals in the form of a parallel flat thin layer, and the said pure black vinyl sheet may be replaced by a white vinyl sheet with a pattern of minute black spots numerously dispersed at even intervals. By doing so, the reflection effect of thus-produced screen becomes even better than that of the black screen.

After making studies with a microscope on various kinds of minute substances which may be coated on the screen as a reflecting material, the inventor has obtained the following results. When the minute substance of the reflecting material is colorless, transparent and round-stick-shaped (for instance, fibrous materials like white cloth, white paper, etc.) or globular (as in case of sticking minute glass beads on the surface of the screen thereby making use of a refraction and reflection of light, the screen made with them may look white under scattered light; but, under parallel beams of light, the incoming light produces chromatic aberration after being refracted and therefore much of such colors as red, orange, yellow and green are reflected at the part of endogenous wavelength of visible rays and the whole surface of the screen becomes tinged with a yellowship brown. Further, when the minute substance is in the form of irregularly-shaped polygonal small pieces (as in the case of aluminum granules), such a reflecting material has so many phases which cause diffraction of light that a part of the reflected light loses the balance of each wave-length as a white color, consequently, a brown color appears on the surface of the screen. Thus, all the existing motion picture screens look pure white whether they are indoors or outdoors, but they appear more or less brown under the incoming light similar to parallel beams of light.

In contrast thereto, when the minute substance is the main element of the reflecting material and is in the form of a colorless transparent flat thin layer, the overlap of such parallel flat thin layers causes the rays reflecting from each layer to overlap one another on the same optical axis. This makes it possible to obtain a high-rate of reflecting power (for instance, the reflection from numerously over-lapped cellophane films presents brightness similar to the reflection from a silvery surface) and yet no chromatic aberration arises and, under any type of incoming light, it is always possible to obtain a reflection the same as the original colors of the incoming light. The reason why the inventor has selected minute crystals in the form of a colorless transparent parallel flat thin layer as a reflecting material, is based on the results of the aforementioned studies.

Further, the inventor has made studies on the problem of halation among minute particles used as reflecting material for the purpose of improving the contrast of the image and has found that the particles used as reflecting material in all the existing motion picture screens have such large meshes that the halation among such particles is strong and this makes the contrast dull; while, the minute crystals selected by the inventor are smaller and moreover are in the form of a parallel flat thin layer; consequently, no halation among such particles arises with the exception that 20-25% of the incoming light which passes through the thin layer has a very little halation as a secondary phenomenon reflecting to the whiteness of the surface of the screen.

Now, when reflecting a substance on a flat glass plate on the back of which a sheet of white paper is attached, the image therefrom is almost unrecognizable; but if a sheet of black paper is used instead of a white one, the contrast becomes clearer and even a very faint part of the image can be recognized. Making use of this principle, the inventor sprayed the admixture of the minute crystals in the form of a colorless transparent parallel flat thin layer and an adhering agent onto a pure black vinyl sheet or white vinyl sheet with a pattern of minute black spots numerously dispersed at even intervals. By doing so, the inventor has successfuly produced a screen which presents an uncomparably sharp image with not only a clear contrast between light and darkness but also a faint half-tone shade and which can clearly reflect the original colors projected thereon without having any yellowish brown color.

Having thus disclosed the invention, what is claimed is:
A motion picture screen comprising a smooth black base member with an optical projection surface provided thereon, said surface comprising a colorless, adhesive coating with a layer of minute, colorless, flat, transparent, fine scales of the scabbard fish dispersed therein said scales being aligned parallel to said base member, and overlapping in a leafing arrangement so as to completely cover said base member.

References Cited by the Examiner

UNITED STATES PATENTS

| 1,868,834 | 7/32 | Hurley | 88—28.9 |
| 1,926,923 | 9/33 | Suzuki | 88—28.9 |
| 2,002,733 | 3/35 | Earle | 117—159 X |
| 2,944,462 | 7/60 | Harkness | 88—28.9 |

FOREIGN PATENTS 3,880   1/87   Great Britain.

JULIA E. COINER, *Primary Examiner.*

R. D. NEVINS, *Examiner.*